(12) United States Patent  
Le Grand et al.

(10) Patent No.: US 8,892,403 B1  
(45) Date of Patent: Nov. 18, 2014

(54) DETERMINING SENSOR INFORMATION BASED ON EVENTS ASSOCIATED WITH A MOBILE DEVICE

(71) Applicant: Google Inc., Mountain View, CA (US)

(72) Inventors: Etienne Le Grand, Mountain View, CA (US); David Nicholas Christie, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/039,389

(22) Filed: Sep. 27, 2013

Related U.S. Application Data

(60) Provisional application No. 61/844,244, filed on Jul. 9, 2013.

(51) Int. Cl.  
*G01D 9/00* (2006.01)

(52) U.S. Cl.  
CPC ........................................ *G01D 9/00* (2013.01)  
USPC ....................................................... 702/187

(58) Field of Classification Search  
USPC ......................................................... 702/187  
See application file for complete search history.

(56) References Cited

U.S. PATENT DOCUMENTS

2007/0033302 A1* 2/2007 Lin et al. ......................... 710/22  
2010/0302028 A1 12/2010 Desai et al.

OTHER PUBLICATIONS

Inactive—definition of inactive by the Free Online Dictionary, printed on Dec. 20, 1013, 1 page.*  
What is sleep mode_—A Word Definition From the Webopedia Computer Dictionary, printed on Dec. 20, 2013, 1 page.*

* cited by examiner

*Primary Examiner* — Tung S Lau  
(74) *Attorney, Agent, or Firm* — McDonnell Boehnen Hulbert & Berghoff LLP

(57) ABSTRACT

Methods and systems for enabling a mobile device to batch sensor data based on events associated with the mobile device and without utilizing one or more main application processors are disclosed. In one example, a system is provided. The system may include one or more sensors, a memory, one or more main application processors, and one or more sensor processors. The one or more main application processors may be configured to, based on an event associated with the mobile device, send data indicating a request for sensor data to the one or more sensor processors. In response, the one or more sensor processors may be configured to determine sensor data using the one or more sensors while the one or more main application processors of the mobile device is in the inactive state. Once the sensor data has been determined, the one or more sensor processors may store the sensor data into one or more first in, first out (FIFO) queues in the memory.

20 Claims, 5 Drawing Sheets

DETERMINING SENSOR INFORMATION BASED ON EVENTS ASSOCIATED WITH A MOBILE DEVICE

CROSS-REFERENCE TO RELATED APPLICATIONS

The present non-provisional utility application claims priority under 35 U.S.C. §119(e) to provisional application No. 61/844,244 filed on Jul. 9, 2013, the entire contents of which are herein incorporated by reference.

BACKGROUND

In addition to having advanced computing and connectivity capabilities to facilitate high-speed data communication, many modern mobile devices include a variety of sensors. For example, mobile devices, such as smartphones, tablets, and wearable computing devices, are often equipped with sensors for imaging, positioning, and relative motion determination. A few examples of sensors that may be found in a mobile device include accelerometers, gyroscopes, global positioning systems (GPSs), compasses, microphones, cameras, Wi-Fi sensors, magnetic sensors, and pressure sensors, among other types of sensors.

Applications that are configured to operate on a mobile device may take advantage of the wide variety of available sensors to perform various functions. As an example, many applications take advantage of positioning sensors available on a mobile device to provide location-based services. A few of the most common mobile location-based services include mapping, navigation, and searching for nearby restaurants or stores. As another example, some mobile applications track health and fitness information using sensors of a mobile device. Other applications use sensors in mobile devices to facilitate monitoring environmental conditions. The applications described above are just a few of the many examples of applications that utilize sensors of a mobile device.

SUMMARY

Within examples, methods and systems are disclosed that may allow a mobile device to efficiently batch sensor data based on events associated with the mobile device and without utilizing the main application processor of the mobile device.

In one example aspect, a method of batching sensor data while one or more main application processors of a mobile device are in an inactive state is provided. The method may include, based on an event associated with the mobile device, receiving, by one or more sensor processors and from the one or more main application processors, data indicating a request to collect sensor data using one or more sensors of the mobile device. The one or more sensor processors may be configured to determine sensor data using less power than the one or more main application processors use when determining sensor data. The method may also include, in response to receiving the data indicating the request, determining, by the one or more sensor processors, sensor data using the one or more sensors while the main application processor of the mobile device is in the inactive state. The method may additionally include storing the sensor data into one or more first-in, first-out (FIFO) queues in the memory.

In another example aspect, a system in a mobile device is provided. The system may include one or more sensors, a memory, one or more sensor processors, and one or more main application processors. The one or more main application processors may be configured to, based on an event associated with the mobile device, send data indicating a request for sensor data to the one or more sensor processors. The one or more sensor processor may be configured to, in response to the request for sensor data, determine sensor data using the one or more sensors while the one or more main application processors of the mobile device is in the inactive state and store the sensor data into one or more first in, first out (FIFO) queues in the memory.

In still another example aspect, a computer-readable medium having stored thereon instructions that, when executed by a processor, cause the processor to perform functions is provided. The functions may include, based on an event associated with a mobile device, receiving, by one or more sensor processors and from one or more main application processors of the mobile device, data indicating a request to collect sensor data using one or more sensors of the mobile device. The one or more sensor processors may be configured to determine sensor data using less power than the one or more main application processors use when determining sensor data. The functions may also include, in response to receiving the data indicating the request, determining, by the one or more sensor processors, sensor data using the one or more sensors while the one or more main application processors of the mobile device are in the inactive state. The functions may additionally include storing the sensor data into one or more first-in, first-out (FIFO) queues in a memory of the mobile device. The functions may further include determining, using the stored sensor data, a geographic location of the mobile device.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
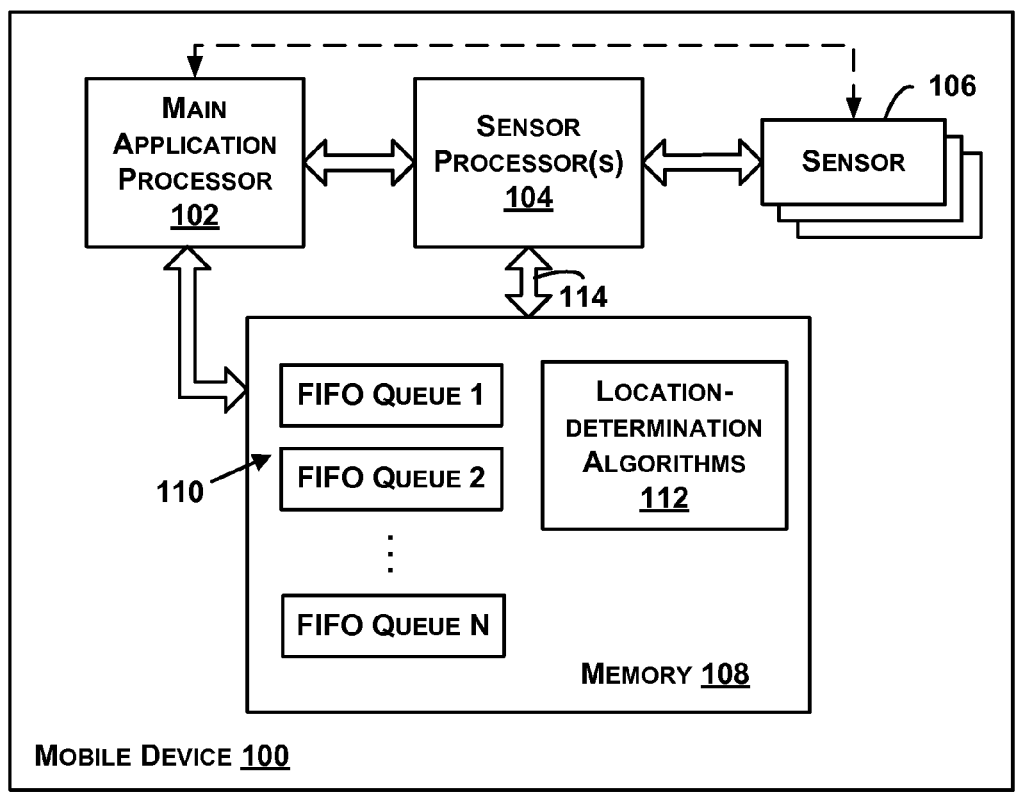
FIG. 1 illustrates an example mobile device.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

In some instances, a mobile device, such as a cellular phone, may utilize a main application processor to acquire various forms of sensor data. For instance, the mobile device may acquire data using one or more of an accelerometer, a gyroscope sensor, a global positioning system (GPS), a Wi-Fi sensor, a pressure sensor, a magnetic sensor, or other types of sensors. The acquired sensor data may then optionally be provided to one or more location-determination algorithms that facilitate determining the location associated with the mobile device.

Using the main application processor to acquire the sensor data can be computationally expensive in terms of power. A mobile device that constantly tries to acquire sensor data using the main application processor may rapidly consume its available battery power. To address such concerns, a mobile device may employ methods and systems for efficiently acquiring sensor data without utilizing the main application processor of the mobile device. In some instances, the sensor data may be efficiently acquired even when there is no active application or process requesting the sensor data. Optionally, if the main application processor later determines that sensor data for a previous time period (e.g., the previous thirty seconds, five minutes, one hour, etc.) is desired, the sensor data may be retrieved from a memory and provided to the main application processor.

In one example, a mobile device may include a main application processor that is the primary processor for the mobile device. The mobile device may also include one or more sensor chips (e.g., integrated circuits, microprocessors, or other signal processing components) that are used to acquire sensor data without utilizing the main application processor. The sensor chips may be part of a sensor of the mobile device or may be dedicated sensor chips that are used to control the acquisition and processing of sensor data. Additionally, the one or more sensor chips may be configured to utilize a data buffer to store the sensor data in one or more first-in, first-out (FIFO) queues. Data stored in a FIFO queue may remain in the FIFO queue until the sensor data is requested by the main application processor.

While the one or more sensor chips acquire the sensor data, the main application processor may remain in a sleep state or inactive state. Because the one or more sensor chips consume much less power when acquiring sensor data than the main application processor consumes, allowing the main application processor to remain in an inactive state may help conserve battery life of the mobile device. If an application on the mobile device subsequently requests sensor data, the main application processor may request a batch of sensor data from the appropriate FIFO queue(s).

Acquiring sensor data may generally be performed in two different manners: constantly or all the time, or upon determining when the sensor data is needed. For example, the sensor chips of the mobile device may continuously obtain sensor data or obtain sensor data in response to a trigger such as an operation performed with the mobile device. However, having sensor chips continuously acquire sensor data—while possibly less computationally expensive than the main application processor continuously acquiring the sensor data—may still be expensive in terms of power, and requesting sensor data when needed (e.g., in response to an event) may not leave enough time to obtain sufficient data. Accordingly, described herein are methods and systems that may allow a mobile device to perform batching (receiving and storing sensor data in FIFO queues) in a manner that may further reduce power consumption and may further help conserve battery life of the mobile device by batching sensor data using a sensor processor based on events associated with the mobile device that may be indicative of when the sensor data may be needed in the future.

In some instances, batching may begin automatically. For example, a mobile device may determine an application has registered for a location based service. Upon making such a determination, the mobile device may begin batching sensor data because the initiation of the location based service may be an indication that location information associated with the mobile device may soon be desired. Alternatively, in another simpler example, the mobile device may begin batching as a result of a reminder for a certain calendar event or at a particular time. Other examples are possible as well and will be discussed in more detail throughout this disclosure.

Using the systems and methods described herein, a mobile device may reduce power consumption by more intelligently and efficiently requesting sensor data, using a sensor processor, under circumstances more likely to be relevant when determining a location associated with the mobile device.

Referring now to the figures, FIG. 1 illustrates an example mobile device 100. The mobile device 100 may represent any type of mobile computing device. By way of example, the mobile device 100 may be a mobile phone. However, the example is not meant to be limiting. In other instances, the mobile device 100 may be a laptop computer, tablet, wearable computing device, or other type of computing device.

As shown in FIG. 1, the mobile device 100 may include a main application processor 102, one or more sensor processors 104, one or more sensors 106, and a memory 108. The main application processor 102 and the one or more sensor processors 104 may be any type of processor, such as a microprocessor, digital signal processor, multicore processor, etc., coupled to the memory 108.

Additionally, the one or more sensor processors 104 may be configured to utilize the one or more sensors 106 to acquire and store sensor data using less power than the main application processor 102 consumes when utilizing the one or more sensors 106 to acquire and store sensor data. For instance, the one or more sensor processors 104 may be configured to transition from inactive or idle states to active states more quickly than the main application processor 102, allowing the one or more sensor processors 104 to consume less average power when periodically using the one or more sensors 106 to acquire sensor data.

In one example, any of the one or more sensor processors 104 may be a processor that is a component of a sensor. For instance, a given processor of the one or more sensor processors 104 may be a processor that is part of an accelerometer chip. Further, any of the one or more sensor processors 104 may be a dedicated sensor processor that is configured to acquire and store data using multiple sensors of the one or more sensors 106.

In one embodiment, the mobile device 100 may include a large system on a chip (SoC) having a main application processor as well as a more efficient, smaller, sensor processor. In another embodiment, the one or more sensor processors 104 may be a low-power core that is a component of the main application processor 102. For instance, the main application processor 102 may be a multi-core processor and a given core of the multi-core processor may be reserved for use as a sensor processor.

The one or more sensors 106 may include any of a variety of types of analog and/or digital sensors. For instance, the one or more sensors 106 may include one or any combination of a GPS, a Wi-Fi sensor, a gyroscope, a compass, an accelerometer, a barometer or other type of pressure sensor, an ambient light sensor, a microphone, a camera, and/or a magnetic sensor, among other types of sensors. In one example, the Wi-Fi sensor may be configured to scan for available wireless access points within a wireless range of the mobile device by broadcasting one or more probe requests.

The memory 108 may be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis. Although the memory 108 is shown as a single component, in other examples, the mobile device may include multiple memories (not shown). For example, the main application processor 102 may be coupled to a first memory and the one or more sensor processors 104 may be coupled to a second memory. In such an example, the main application processor 102 may retrieve data stored in the second memory by requesting the data from the one or more sensor processors 104.

The memory may include one or more FIFO queues 110 and one or more location-determination algorithms 112. Each of the one or more FIFO queues 110 may be implemented in the form of a set of read and write pointers, data storage, and control logic. For instance, the data storage may be SRAM, flip-flops, latches or any other suitable form of storage, and the control logic may specify how the one or more sensor processors 104, and optionally the main application processor 102, may read/write to the date storage.

In other examples (not shown in FIG. 1) the one or more FIFO queues 110 may not be included in the memory. Instead, FIFO queues 110 may, for example, be included in sensor processor(s) 104 or the one or more sensors 106. In further examples, the one or more FIFO queues may be included in the main application processor 102.

In one example, the one or more sensor processors 104 may be configured to determine sensor data using the one or more sensors 106 on an interval basis. As an example, the one or more sensor processors 104 may acquire data using each of the one or more sensors 106 once per second, multiple times per second, once per minute, multiple times per minute, etc. However, in other examples, each of the one more sensors 106 may be used to acquire data at different respective intervals. For instance, the one or more sensor processors 104 may be configured to acquire sensor data using a GPS once per minute, acquire sensor data using an accelerometer once every tenth of a second, and acquire sensor data using a Wi-Fi sensor once every two minutes. The one or more sensor processors 104 may also be configured to store the acquired sensor data into one or more FIFO queues as the sensor data is determined.

In another example, the one or more sensor processors 104 may be configured to determine the sensor data while the main application processor is inactive and the mobile device is in a sleep mode based on an event associated with mobile device 100. As an example, the one or more sensor processors 104 may be configured to acquire sensor data using the one or more sensors 106 when a user of mobile device 100 actively browses a web page. Other events are possible and will be discussed in more detail later in this disclosure.

The one or more sensor processors 104 may be configured to determine the sensor data while the main application processor is inactive and the mobile device is in a sleep mode. For example, the one or more sensor processors 104 may be configured to acquire sensor data using the one or more sensors 106 without requiring that the main application processor be transitioned into an active state. In one instance, the one or more sensor processors 104 may be configured to acquire sensor data without having an application of the mobile device specifically requesting that sensor data be acquired.

In some examples, the one or more sensor processors 104 may also be configured to discount a portion of the sensor data that is stored in a given FIFO queue of the one or more FIFO queues 110 when the given FIFO queue is full, such that additional sensor data for a subsequent interval may be stored into the given FIFO queue. By way of example, if a sensor processor is configured to acquire sensor data using an accelerometer once every tenth of a second and store the sensor data in a FIFO queue that can hold three thousand elements, the FIFO queue may be full after storing five minutes of sensor data. To facilitate storing subsequently acquired sensor data, the sensor processor may be configured to erase or condense the stored sensor data.

In other examples, the one or more sensor processors 104 may utilize a series of cascading FIFO queues that may cascade to each other (i.e., allow sensor data to overflow from a particular FIFO queue in the series into another FIFO queue when the particular FIFO queue becomes full). In some examples the series of cascading queues may be arranged by size. For instance, smaller FIFO queues may be positioned closer to the one or more sensors 106 and larger FIFO queues may be used closer to application processor 102. While the bigger FIFO queues may be more expensive to access, they can accept data in bulk. In one example, the one or more sensors 106 may initially store sensor data in the smaller FIFO queues that are closer, and once full, the smaller FIFO queues may be emptied into farther away bigger FIFO queues.

In one instance, the one or more sensor processors 104 may be configured to continuously acquire the sensor data and store the acquired sensor data into the one or more FIFO queues 110. In another instance, the one or more sensor processors 104 may be configured to acquire sensor data for a predetermined length of time in response to receiving a request from the main application processor 102. For example, the one or more sensor processors 104 may receive data from the main application processor 102 indicating a request to acquire and store sensor data for a period of five minutes. In still another instance, the one or more sensor processors 104 may be configured to acquire and store sensor data at regular scheduled times. For example, the one or more sensor processors 104 may be configured to acquire and store sensor data between the hours of 8 AM and 10 AM and between the hours of 4 PM and 6 PM every day, or between the hours of 8 AM and 8 PM every day.

In some instances, the one or more sensor processors 104 may also be configured to process data received from one or a combination of the one or more sensors 106, and store the processed sensor data in the one or more FIFO queues. For example, a given sensor processor may be configured to fuse sensor data from at least two of the one or more sensors 106 to determine an output, and store the determined output in a FIFO queue.

The main application processor 102 may also be configured to retrieve sensor data for a recent time period in some examples. For instance, the main application processor 102 may be configured to receive data indicating a request for sensor data for a recent time period. In response to receiving the request for sensor data for a recent time period, the main application processor 102 may be configured to retrieve the sensor data for the recent time period from the one or more FIFO queues.

As an example, the main application processor 102 may receive data indicating a request for GPS and Wi-Fi sensor data for the past thirty seconds. The request may be received from an application of the mobile device 100 that estimates a geographic location of the mobile device 100, for instance. Upon retrieving the GPS and Wi-Fi sensor data from one or more FIFO queues, the main application processor 102 may be caused to estimate a geographic location of the mobile device 100 using the retrieved sensor data.

In one example, the memory 108 may store one or more location-determination algorithms that the main application processor 102 may execute to estimate the geographic location of the mobile device 100. For instance, the main application processor 102 may use a location-determination algorithm to determine a location of the mobile device 100 based on the presence and/or location of one or more known wireless access points within a wireless range of the mobile device 100. In one example, the retrieved sensor data may include data indicating an identity of one or more wireless access points (e.g., a MAC address) and intensity of signals received (e.g. received signal strength indication) from each of the one or more wireless access points at various time instances over a period of time. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access point, a location estimate of the mobile device 100 may be determined for each time instance over the period of time.

In another example, the retrieved sensor data may include data indicating a fingerprint based on a pattern of signals received from one or more wireless access points. The main application processor 102 may execute a location-determination algorithm that involves comparing the fingerprint to one or more known calibration points for which a geographic location is known. Various deterministic algorithms, such as nearest neighbor in signal space (NNSS), k-nearest neighbor (KNN), and weighted k-nearest neighbor (WKNN), may be used to determine a closest calibration point to the fingerprint. Probabilistic methods may also be used to determine a most likely location based on a relationship between the fingerprint and known calibration points.

In another instance, the main application processor 102 may use a location-determination algorithm to determine a location of the mobile device 100 based on nearby cellular base stations. For example, the retrieved sensor data may identify the cell from which the mobile device 100 last received signal from a cellular network at a given time. In an example in which the one or more sensors 106 include a cellular radio communication component, the cellular radio communication component may be configured to measure a round trip time (RTT) to a base station providing the signal. Thus, the retrieved sensor data may also include a RTT. In such an example, the main application processor 102 may be caused to combine this information with the identified cell to determine a location estimate.

In some examples, the main application processor 102 may combine sensor data determined using a combination of the one or more sensors 106, such as a combination of a Wi-Fi sensor, GPS, and cellular radio communication component, to estimate a location of the mobile device 100. For example, the main application processor may use the information from the Wi-Fi sensor, the GPS, and the cellular radio communication component along with dead reckoning (or ded reckoning) to estimate a location of the mobile device 100. In another example, the mobile device may use the one or more sensors 106 to obtain thirty seconds of sensor data (e.g., data from an accelerometer, gyroscope, or magnetometer) and thereafter use the obtained data for pedestrian dead reckoning. In this example, with the aid of frequent accelerometer, magnetometer and gyroscope scans, the mobile device may have need less frequent wifi scans or gps locations, which may be much more efficient and feasible from a power perspective.

As shown in FIG. 1, each of the main application processor 102, one or more sensor processors 104, one or more sensors 106, and memory 108 may be coupled together by one or more system buses, networks, or other connection mechanisms 114.

In some implementations, the mobile device 100 may include a device platform (not shown), which may be configured as a multi-layered Linux platform. The device platform may include different applications and an application framework, as well as various kernels, libraries, and runtime entities. In other examples, other formats or systems may operate the mobile device 100 as well.

Figure 2:
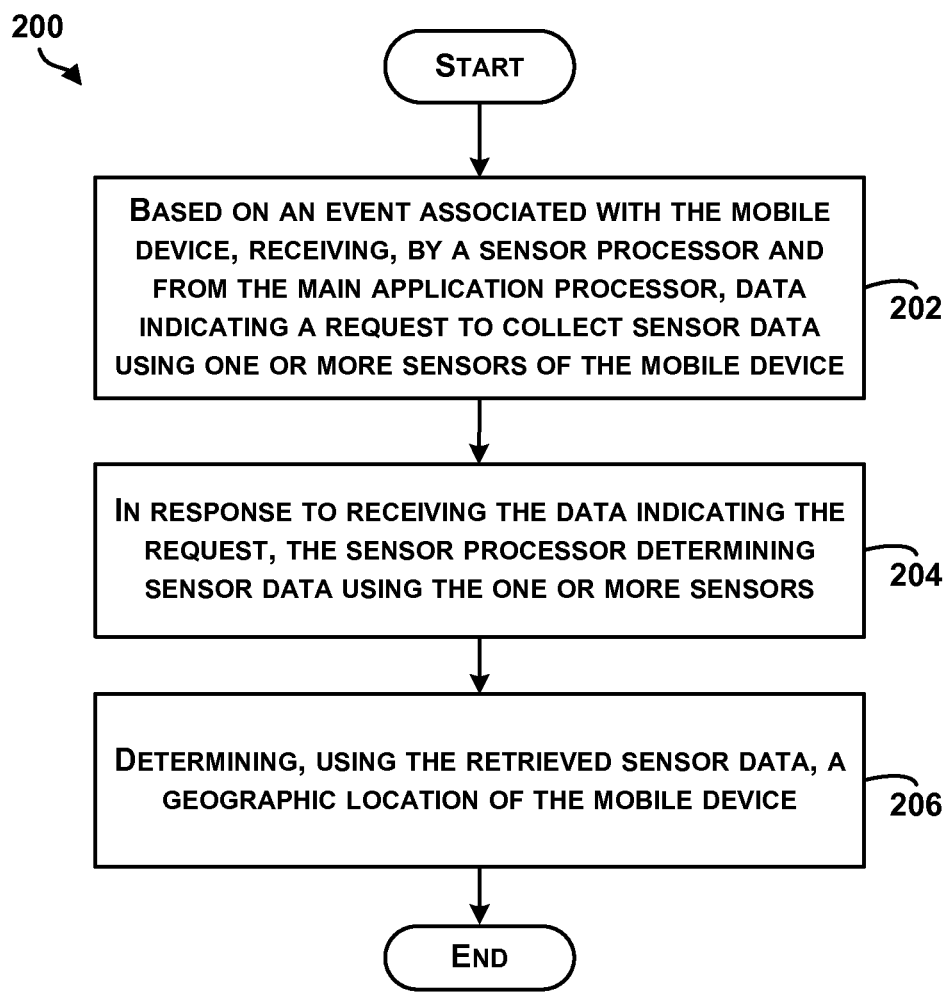
FIG. 2 is a block diagram of an example method for batching sensor data.

FIG. 2 is a block diagram of an example method 200 for batching sensor data based on an event associated with a mobile computing device. Method 200 shown in FIG. 2 presents an embodiment of a method that could be used or implemented by the one or more sensor processors 104 of FIG. 1, for example, or more generally by any computing device. In some instances, the method 200 may be used to obtain sensor data while a main application processor of a mobile device is in an inactive state. Method 200 may include one or more operations, functions, or actions as illustrated by one or more of blocks 202-206. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and random access memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device.

In addition, for the method 200 and other processes and methods disclosed herein, each block in FIG. 2 may represent circuitry that is wired to perform the specific logical functions in the process.

Initially, at block 202, method 200 includes based on an event associated with the mobile device, receiving by a sensor processor and from the main application processor, data indicating a request to collect sensor data using one or more sensors of the mobile device. In other words the event may trigger the collection and determination of sensor data, using the sensor processor and the one or more sensors, by the mobile device. Receiving sensor data based on events may provide applications of the mobile device with future access to the sensor data at a later-desired time. Such sensor data may provide useful context information about a recent state of the mobile device or behavior of a user of the mobile device that may be used by the mobile device as needed.

The event may be any event associated with the mobile device and may include activities performed with the mobile device such as initiating a request of the mobile device. The events may, for example, be performed at a location or be performed at a certain time. In other examples, the event may be preset and require no action with the mobile device. For example, the event may include a particular time that was predefined. For instance, the event may be 12:00 AM, and upon reaching that time every day, the sensor processor may receive data. Other events are possible as well and contemplated herein.

Optionally, the event may be indicative of which of the one or more sensors to use to collect sensor data and/or how often to use each of the respective sensors to collect the sensor data (e.g., at what respective interval based on the event). For example, considering scenarios in which an event occurs a location, the sensor processor and one or more sensors may be configured to determine sensor data as long as the mobile device remains in that location. In other embodiments, the sensor processor may collect sensor data using the one or more sensors continuously based on an occurrence of the event.

In one example, the event may include initiating a request of the mobile device. The request, for example, may include a request to search the Internet (i.e., searching the Internet) or a request to initiate a phone call. Other requests may include browsing a web application on the mobile device, powering on the mobile device, or operating a particular application of the mobile device to name a few. Other requests are possible and contemplated herein. In other examples, the event may include causing a particular movement of the mobile device. Such movements may be caused based on a user running or walking with the mobile device, for example. Other events are possible as well and are contemplated herein. In some scenarios, the mobile device may receive the sensor data based on an occurrence of the event, while in other scenarios the mobile device may obtain the sensor data after an occurrence of the event.

For instance, a user of mobile device, such as mobile device 100, may operate an application of the mobile device 100 such as a restaurant location application. Upon operating the restaurant location application, mobile device 100 may use sensor processor 104 to collect location-based sensor data (e.g., GPS data) using the one or more sensors 106 because it may be likely that location of the mobile device may be of use to the user at a later time. Determining this, mobile device 100 may begin receiving location information using, for example, a GPS sensor of sensors 106 while the restaurant location application is active. Other sensor data may be obtained as well. Once the user has ceased using the restaurant location application (i.e., the location based application is inactive), the one or more sensors may cease receiving sensor data.

In other examples, the event may occur at a location, and the mobile device may receive the sensor data based on the location of the mobile device in relation to the event location. For example, the mobile device may determine that it is in a predefined location or area, and upon determining that the mobile device is positioned near (e.g., within a certain range) or within the location or predefined area, the mobile device may begin receiving the sensor data. The location or predefined area may include defined areas such as a shopping mall, an airport, or a geo-fence. Other examples may an office building, a home, or a transportation hub (e.g., a train station). However, these are examples only and any predefined area that may be important to the mobile device may be used. Alternatively, and in other examples, the mobile device may cease receiving the sensor data upon the determination that the mobile device is positioned near or within the location.

For instance, upon entering an airport, the mobile device may acquire relevant sensor data for future use. Because the mobile device is in the airport it may determine that a travel (e.g., a flight) is imminent and obtain sensor data in preparation for bad service or inhibited sensor operation, for example. Thereafter, when a user of the mobile device utilizes the mobile device in a manner that requires sensor data when the sensors are unavailable, for example during the flight, the received sensor data may be used as an alternative.

In yet even further examples, the sensor processor may obtain sensor data based on a time period. In this example embodiment, the event may take place over various periods of time including five minutes, an hour, a day, a week, etc. The one or more sensors may, for example, collect sensor data during the time period or upon the expiration of the time period.

For example, if a user of a mobile device indicates, using a calendar event, for example, that he/she will be exercising for an hour, the one or more sensors may be configured not to collect sensor data during that hour because it may be likely the sensor data will not be relevant to the user during that time or for some time thereafter. As another example, if a user indicates, using a calendar event, that he/she will be attending a concert at a specific time, the one or more sensors may be configured to continuously collect sensor data for thirty minutes prior to the attendance of the concert. Obtaining sensor data prior to the concert may obviate a need obtain sensor data during the concert, which may be more computationally expensive because there is likely to be many mobile devices operating, which may inhibit or interfere with sensor data acquisition. Instead, the mobile device will be able to obtain the information from a FIFO queue, as discussed in more detail below in regard to block 204.

Note, while various events and scenarios have been noted above, these events and scenarios are examples only and are not intended to be limiting. Other events and scenarios may be possible and are contemplated herein.

At block 204, the method 200 includes in response to receiving the data indicating the request, the sensor processor determining sensor data using the one or more sensors. The sensor processor may determine the sensor data while the main application processor is in an inactive state, however the main application processor does not have to be in an inactive state. In one example, the one or more sensors may include one or any combination of a GPS, a Wi-Fi sensor, a gyroscope, a compass, an accelerometer, a barometer or other type of pressure sensor, an ambient light sensor, a microphone, a camera, and/or a magnetic sensor, among other types of sensors. As discussed, above, the sensor processor may determine sensor data using the one or more sensors based on an event associated with the mobile device. Each sensor may be used to collect sensor data. In some instances, determining the sensor data using the one or more sensors may involve combining sensor data received from at least two of the one or more sensors.

At block 206, the method 200 includes storing, by the sensor processor, the determined sensor data into one or more FIFO queues of a memory. In one example, sensor data for each type of sensor used may be stored in a separate FIFO queue. In other examples, the determined sensor data may be stored in a series of cascading FIFO queues. In another example, sensor data determined using two or more sensors may be stored within the same FIFO queue. For example, a given FIFO queue may store both accelerometer data and gyroscope data. In an instance in which determining the sensor data involves performing sensor fusion or otherwise combining or processing the sensor data, the processed sensor data may be stored in one or more FIFO queues.

Once the sensor data has been stored in a FIFO queue, the sensor data may be used by the main application processor. In some examples, the main application processor may use stored sensor data to facilitate determining a geographic location of a mobile device. Referring back to the example in which a user operates a restaurant location application described with respect to block 202, the location-based sensor data may be stored in a FIFO queue for later use. For example, if the user of the mobile device operates another location based application (or operates the restaurant location application again) the mobile device may be able to obtain the location-based sensor data without causing the main application processor or the sensor processor to request new sensor data. Instead, the main application processor may retrieve the sensor data from the FIFO queue and determine a location of the mobile device based on the stored data thereby significantly reducing computational power. For instance, the main processor of 102 of mobile device 100 may analyze stored location data, such as GPS logs or logs of nearby wireless access points, that may allow the location based application to quickly determine an estimate of the geographic location of the mobile device based on, for example, a path of the mobile device over a recent time.

Figure 3A:
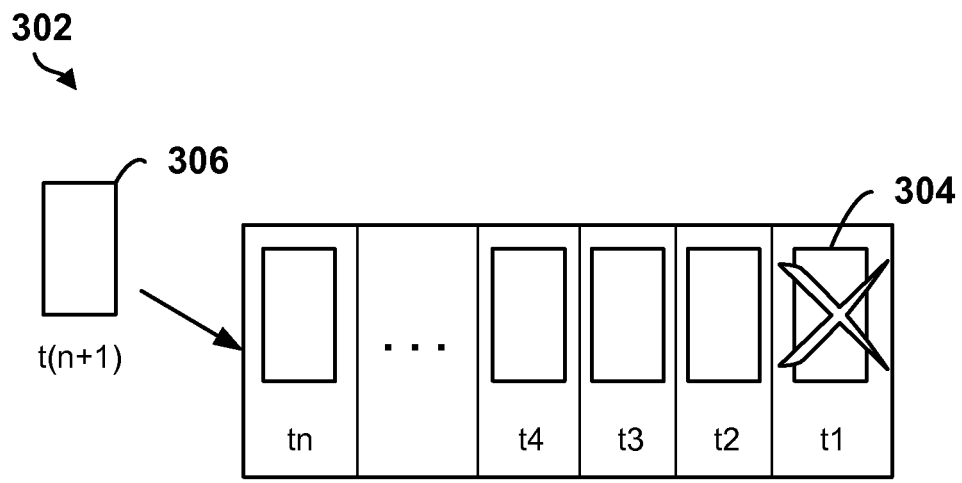
FIGS. 3A and 3B are schematics that illustrate storing sensor data in a FIFO queue.
Figure 3B:
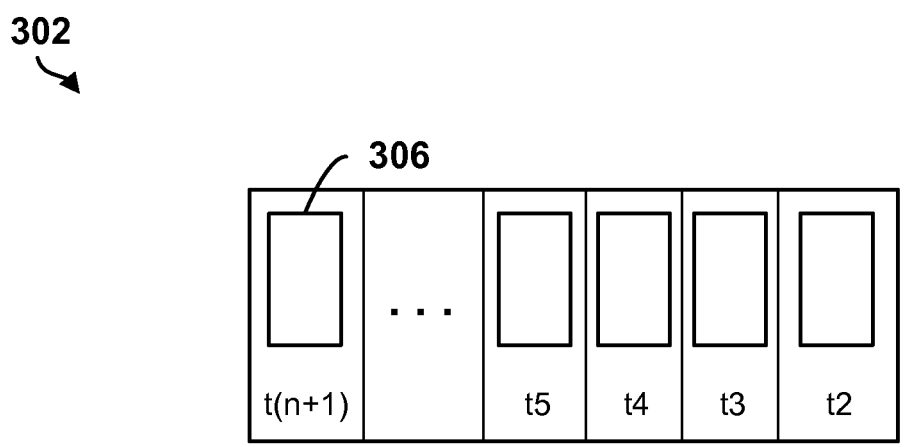

FIG. 3A is a schematic illustrating an example FIFO queue 302. As shown in FIG. 3A, a number "n" elements of sensor data may be stored in a FIFO queue 302. Each of the elements of sensor data may have been captured based on an event and during a time period from time "t1" to "tn". In some examples, the FIFO queue 302 may become full, as shown in FIG. 3A, so a sensor processor may be configured to discount data stored in the FIFO queue 302 by erasing or removing an element 304 stored at the front of the FIFO queue 302. Erasing the element 304 may allow an element 306 of sensor data that was determined at time "t(n+1)" to be stored in the queue 302. As shown in the schematic illustration of FIG. 3B, after the element 304 has been erased, the element 306 may be stored at the end of the FIFO queue 302. In other examples, multiple elements from the front of the FIFO queue may be erased simultaneously. In further examples (not shown) instead of discounting data stored in a FIFO queue by erasing or removing an element, the element may simply overflow into another FIFO queue that may be in series with the FIFO queue from which the element is overflowing.

Figure 4:
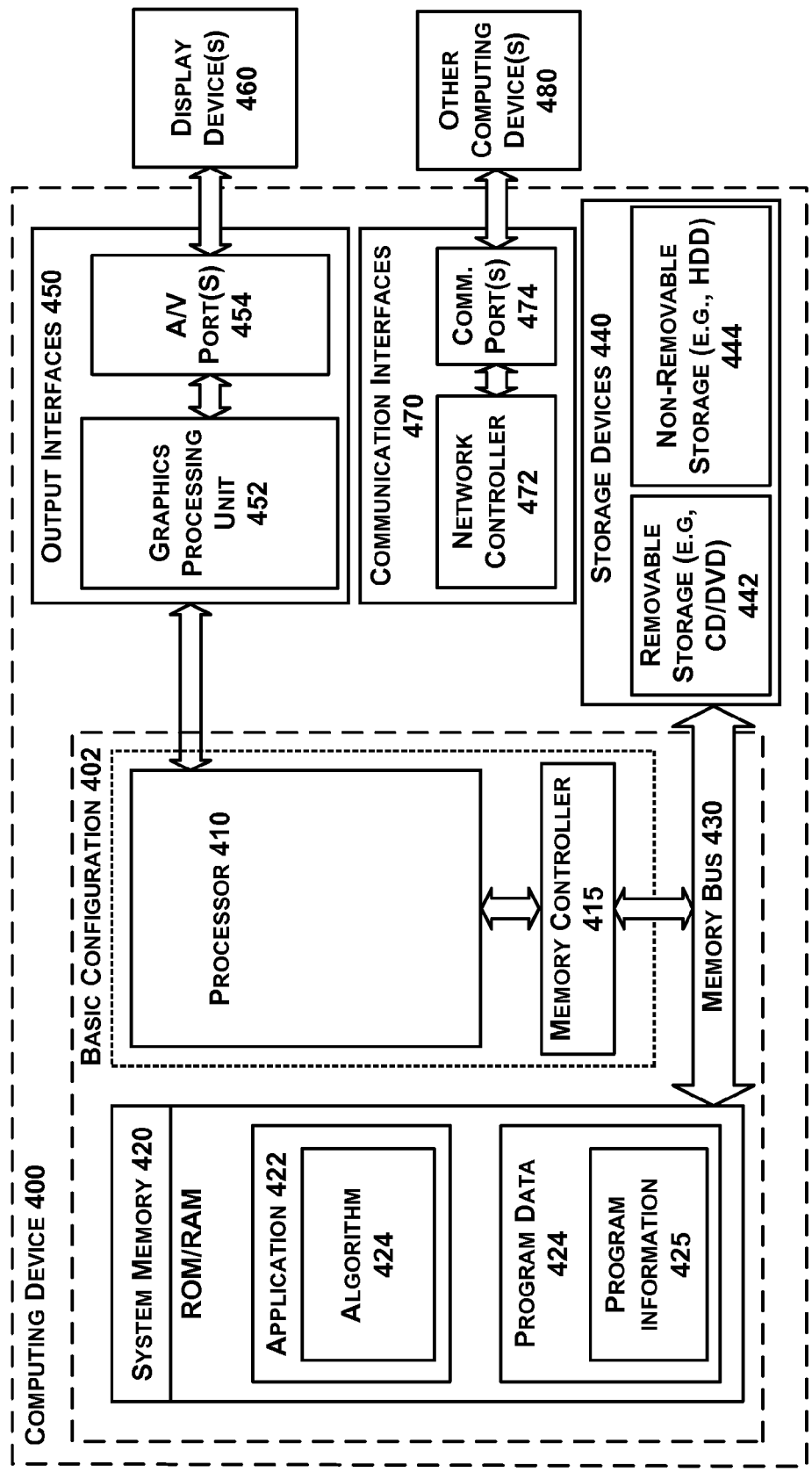
FIG. 4 is a functional block diagram illustrating an example computing device used in a computing system that is arranged in accordance with at least some embodiments described herein.

FIG. 4 is a functional block diagram illustrating an example computing device 400 used in a computing system that is arranged in accordance with at least some embodiments described herein. The computing device 400 may be implemented to determine sensor data using one or more sensor processors or perform any of the functions described above with reference to FIGS. 1-3. In a basic configuration 402, computing device 400 may typically include one or more processors 410 and system memory 420. A memory bus 430 can be used for communicating between the processor 410 and the system memory 420. Depending on the desired configuration, processor 410 can be of any type including but not limited to a microprocessor (µP), a microcontroller (µC), a digital signal processor (DSP), or any combination thereof. A memory controller 415 can also be used with the processor 410, or in some implementations, the memory controller 415 can be an internal part of the processor 410.

Depending on the desired configuration, the system memory 420 can be of any type including but not limited to volatile memory (such as RAM), non-volatile memory (such as ROM, flash memory, etc.) or any combination thereof. System memory 420 may include one or more applications 422, and program data 424. Application 422 may include an algorithm 424 that is arranged to batch sensor data, in accordance with the present disclosure. Program data 424 may include program information 425 that could be directed to any number of types of data. For instance, application 422 may execute an algorithm that is configured to determine sensor data using one or more sensors and store the sensor data into one or more FIFO queues. In some example embodiments, application 422 can be arranged to operate with program data 424 on an operating system.

Computing device 400 can have additional features or functionality, and additional interfaces to facilitate communications between the basic configuration 402 and any devices and interfaces. For example, data storage devices 440 can be provided including removable storage devices 442, non-removable storage devices 444, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer-readable instructions, data structures, program modules, or other data.

System memory 420 and storage devices 440 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media can be part of device 400.

Computing device 400 can also include output interfaces 450 that may include a graphics processing unit 452, which can be configured to communicate to various external devices such as display devices 460 or speakers via one or more A/V ports 454 or a communication interface 470. The communication interface 470 may include a network controller 472, which can be arranged to facilitate communications with one or more other computing devices 480 over a network communication via one or more communication ports 474. The communication connection is one example of a communication media. Communication media may be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 400 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 can also be implemented as a personal computer, including both laptop computer and non-laptop computer configurations, or a server.

Figure 5:
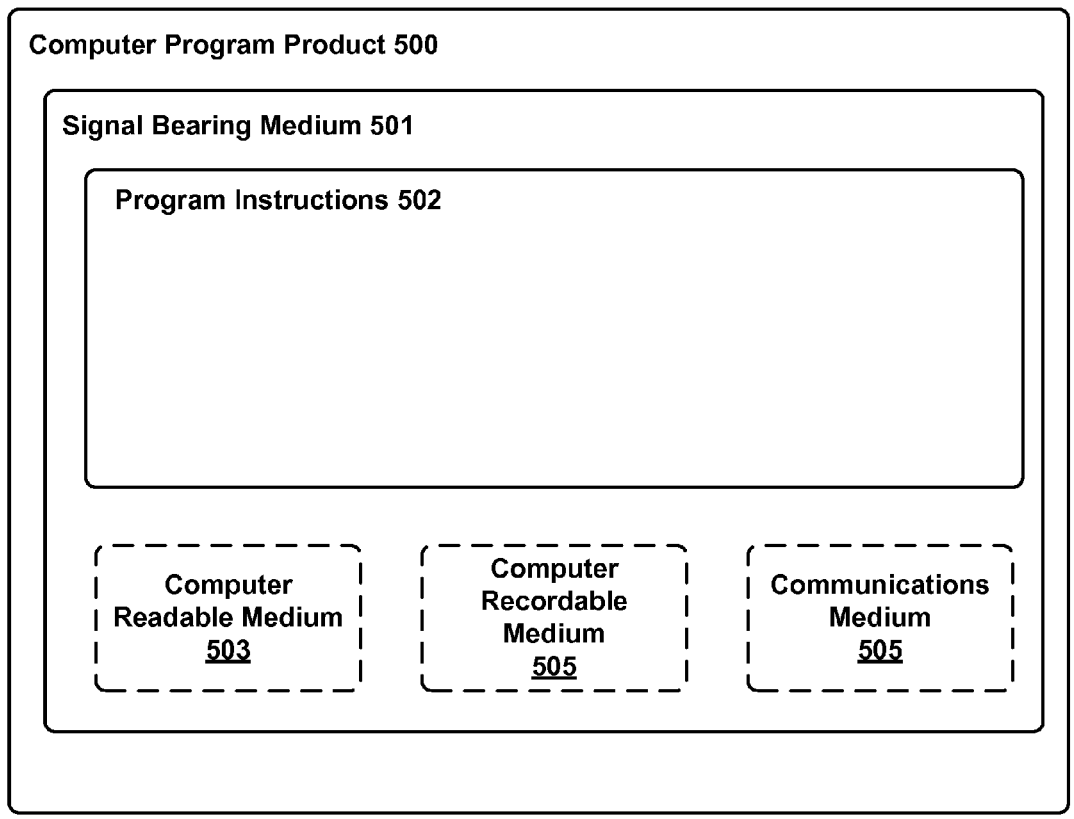
FIG. 5 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a non-transitory computer-readable storage media in a machine-readable format, or on other non-transitory media or articles of manufacture. FIG. 5 is a schematic illustrating a conceptual partial view of an example computer program product 500 that includes a computer program for executing a computer process on a computing device, arranged according to at least some embodiments presented herein.

In one embodiment, the example computer program product 500 is provided using a signal bearing medium 501. The signal bearing medium 501 may include one or more programming instructions 502 that, when executed by one or more processors may provide functionality or portions of the functionality described above with respect to FIGS. 1-3. In some examples, the signal bearing medium 501 may encompass a computer-readable medium 503, such as, but not limited to, a hard disk drive, a Compact Disc (CD), a Digital Video Disk (DVD), a digital tape, memory, etc. In some implementations, the signal bearing medium 501 may encompass a computer recordable medium 505, such as, but not limited to, memory, read/write (R/W) CDs, R/W DVDs, etc. In some implementations, the signal bearing medium 501 may encompass a communications medium 505, such as, but not limited to, a digital and/or an analog communication medium (e.g., a fiber optic cable, a waveguide, a wired communications link, a wireless communication link, etc.). Thus, for example, the signal bearing medium 501 may be conveyed by a wireless form of the communications medium 505 (e.g., a wireless communications medium conforming to the IEEE 802.11 standard or other transmission protocol).

The one or more programming instructions 502 may be, for example, computer executable and/or logic implemented instructions. In some examples, a computing device such as the computing device 400 of FIG. 4 may be configured to provide various operations, functions, or actions in response to the programming instructions 502 conveyed to the computing device 400 by one or more of the computer-readable medium 503, the computer recordable medium 505, and/or the communications medium 505.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method of batching sensor data while one or more main application processors of a mobile device is in an inactive state, the method comprising:
   in response to an application that is running on the mobile device undergoing a triggering event that triggers the one or more main application processors to retrieve batched sensor data at a future point in time from one or more first-in, first-out (FIFO) queues in memory of the mobile device, receiving, by one or more sensor processors and from the one or more main application processors, a request to collect sensor data using one or more sensors of the mobile device, wherein the one or more sensor processors are configured to determine sensor data using less power than the one or more main application processors use when determining sensor data;
   in response to receiving the request, determining, by the one or more sensor processors, sensor data using the one or more sensors while the main application processor of the mobile device is in the inactive state; and
   storing the sensor data into the one or more FIFO queues in memory of the mobile device.

2. The method of claim 1, further comprising:
   determining, using the stored sensor data, a geographic location of the mobile device.

3. The method of claim 1,
   wherein the triggering event comprises initiating a request of the mobile device, and
   wherein receiving the request to collect the sensor data using the one or more sensors of the mobile device comprises receiving the request to collect the sensor data, using the one or more sensors, during a predetermined time period upon the triggering event initiating the request.

4. The method of claim 1,
   wherein the triggering event comprises causing a movement of the mobile device,
   wherein the movement is based on at least one of a walking motion or a running motion, and
   wherein receiving the request to collect the sensor data using the one or more sensors of the mobile device comprises receiving the request to collect the sensor data after an occurrence of the movement of the mobile device.

5. The method of claim 1,
   wherein the triggering event occurs at a location, and
   wherein receiving the request to collect the sensor data using the one or more sensors of the mobile device comprises receiving the request to collect the sensor data based on the mobile device being positioned within a range of the location.

6. The method of claim 1,
   wherein the triggering event occurs over a time period, and
   wherein receiving the request to collect the sensor data using the one or more sensors of the mobile device comprises receiving the request to collect the sensor data based on the time period.

7. The method of claim 3, wherein the request comprises at least one of a request to initiate a web browser application on the mobile device or a request to initiate a phone call using the mobile device.

8. The method of claim 5, wherein the location comprises at least one of a shopping mall, an airport, an office building, a home, a transportation hub, or a geo-fence.

9. The method of claim 6, wherein the time period is associated with the application running on the mobile device.

10. The method of claim 1, wherein the application comprises a calendar application running on the mobile device, wherein the triggering event is an initiation or a termination of a predefined calendar event by the calendar application at the mobile device.

11. The method of claim 10, wherein the predefined calendar event comprises one or more of: a request for the one or more sensor processors to determine the sensor data during a predefined period of time specified by the predefined calendar event and a request for the one or more sensor processors to determine the sensor data for a predefined period of time directly following the termination of the predefined calendar event.

12. A system in a mobile device, the system comprising:
one or more sensors;
a memory;
one or more main application processors; and
one or more sensor processors,
wherein the one or more main application processors are configured to:
in response to an application that is running on the mobile device undergoing a triggering event that triggers the one or more main application processors to retrieve batched sensor data at a future point in time from one or more first-in, first-out (FIFO) queues in the memory, send a request for sensor data to the one or more sensor processors, and
wherein the one or more sensor processors are configured to:
in response to the request for sensor data, determine sensor data using the one or more sensors while the one or more main application processors of the mobile device are in the inactive state; and
store the sensor data into the one or more FIFO queues in the memory.

13. The system of claim 12,
wherein the triggering event comprises initiating a request of the mobile device, and
wherein the one or more main application processors are further configured to, based on the initiation of the request, send the request for sensor data.

14. The system of claim 12,
wherein the triggering event comprises causing a movement of the mobile device,
wherein the movement is based on at least one of a walking motion or a running motion, and
wherein the one or more main application processors are further configured to, based on the movement of the mobile device, send the request for sensor data.

15. The system of claim 12,
wherein the one or more main application processors are further configured to, based on a predetermined time period, send the request for sensor data to be determined during the predetermined time period, and
wherein the one or more sensor processors are configured to:
in response to the request for sensor data to be determined during the predetermined time period, determine sensor data during the predetermined time period using the one or more sensors while the one or more main application processors of the mobile device are in the inactive state.

16. The system of claim 13, wherein the request comprises at least one of a request to search the Internet using the mobile device or a request to initiate a phone call using the mobile device.

17. A non-transitory computer-readable medium having stored therein instructions, that when executed by a processor, cause the processor to perform functions comprising:
in response to an application that is running on a mobile device undergoing a triggering event that triggers one or more main application processors of the mobile device to retrieve batched sensor data at a future point in time from one or more first-in, first-out (FIFO) queues in memory of the mobile device, receiving, by one or more sensor processors and from the one or more main application processors of the mobile device, a request to collect sensor data using one or more sensors of the mobile device, wherein the one or more sensor processors are configured to determine sensor data using less power than the one or more main application processors use when determining sensor data;
in response to receiving request, determining, by the one or more sensor processors, sensor data using the one or more sensors while the one or more main application processors of the mobile device are in the inactive state;
storing the sensor data into the one or more FIFO queues in the memory of the mobile device; and
determining, using the stored sensor data, a geographic location of the mobile device.

18. The non-transitory computer readable medium of claim 17,
wherein the triggering event comprises initiating a request of the mobile device, and
wherein the function of receiving the request to collect the sensor data using the one or more sensors of the mobile device comprises receiving the request to collect the sensor data based on the initiation of the request.

19. The non-transitory computer readable medium of claim 17,
wherein the triggering event occurs at a location, and
wherein the function of receiving the request to collect the sensor data using the one or more sensors of the mobile device comprises, based on the mobile device being within a range of the location, using the one or more sensors to obtain the sensor data.

20. The non-transitory computer readable medium of claim 18, wherein the request comprises at least one of a request to search the Internet using the mobile device or a request to initiate a phone call using the mobile device.

* * * * *